[12] United States Patent
Del Angel et al.

(10) Patent No.: US 11,043,042 B2
(45) Date of Patent: Jun. 22, 2021

(54) GENERATING A SHAPE PROFILE FOR A 3D OBJECT

(71) Applicant: Hewlett-Packard Development Company, L.P., Houston, TX (US)

(72) Inventors: Ana Patricia Del Angel, Guadalajara (MX); Jun Zeng, Sunnyvale, CA (US); Sebastia Cortes i Herms, Barcelona (ES); Scott White, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/072,277

(22) PCT Filed: May 16, 2016

(86) PCT No.: PCT/US2016/032740
§ 371 (c)(1),
(2) Date: Jul. 24, 2018

(87) PCT Pub. No.: WO2017/200527
PCT Pub. Date: Nov. 23, 2017

(65) Prior Publication Data
US 2019/0026953 A1 Jan. 24, 2019

(51) Int. Cl.
*G06T 19/20* (2011.01)
*G06T 19/00* (2011.01)
*G06T 17/10* (2006.01)
(52) U.S. Cl.
CPC .............. *G06T 19/20* (2013.01); *G06T 17/10* (2013.01); *G06T 19/00* (2013.01); *G06T 2210/12* (2013.01); *G06T 2219/008* (2013.01)

(58) Field of Classification Search
CPC ......... G06T 19/20; G06T 17/10; G06T 19/00; G06T 2210/12; G06T 2219/008;
(Continued)

(56) References Cited

U.S. PATENT DOCUMENTS 4,888,583 A * 12/1989 Ligocki ................... G06T 17/10
345/420
5,506,785 A * 4/1996 Blank ...................... G06T 17/30
345/419
(Continued)

OTHER PUBLICATIONS

Prsa, Jelena et al. "Dense 3D-packing algorithm for filling the offset contours of a new printing process based on 3D plastic droplet generation." In Robotics and Biomimetics (ROBIO), 2013 IEEE International Conference on, pp. 74-78. IEEE, 2013.
(Continued)

*Primary Examiner* — Charles L Beard
(74) *Attorney, Agent, or Firm* — Mannava & Kang

(57) ABSTRACT

According to an example, a processing device may slice a 3D model along a first direction to generate a plurality of layers in parallel planes defined across a second direction and a third direction, in which each of the plurality of layers is composed of respective polygons representing portions of the 3D model. The plurality of layers may be partitioned into a plurality of stacked boxes containing the respective polygons and for each stacked box of the plurality of stacked boxes, the polygons in the stacked box may be assembled into a superset polygon and the superset polygon may be partitioned into bounding shapes. A shape profile of the 3D object may be generated using the bounding shapes.

17 Claims, 7 Drawing Sheets

(58) Field of Classification Search
CPC ......... G06T 17/00; G06T 17/05; G06T 17/30;
G06T 7/10; G06T 17/20; G06T 19/006;
G06T 2210/56
See application file for complete search history.

(56) References Cited

U.S. PATENT DOCUMENTS

| | | | | |
|---|---|---|---|---|
| 5,517,602 | A * | 5/1996 | Natarajan | G06T 15/00 345/419 |
| 5,673,377 | A * | 9/1997 | Berkaloff | G06T 15/04 345/585 |
| 6,429,864 | B1 * | 8/2002 | Schwarzer | G06T 15/06 345/419 |
| 6,580,426 | B1 * | 6/2003 | Small | G06T 17/005 345/418 |
| 6,614,928 | B1 * | 9/2003 | Chung | G01B 11/00 356/627 |
| 6,930,682 | B1 * | 8/2005 | Livingston | G06T 17/20 345/420 |
| 7,054,029 | B1 * | 5/2006 | Ohta | H04N 1/3871 358/1.12 |
| 7,173,616 | B2 * | 2/2007 | Boekhorst | G06T 15/06 345/419 |
| 7,206,987 | B2 * | 4/2007 | Roth | G06F 11/1072 714/755 |
| 7,290,221 | B2 * | 10/2007 | Anderson | G06T 17/20 715/848 |
| 7,542,622 | B1 * | 6/2009 | Angelini | G06K 9/40 382/275 |
| 7,747,055 | B1 * | 6/2010 | Vining | G06T 7/0012 382/131 |
| 7,898,540 | B2 * | 3/2011 | Usami | G06T 17/20 345/424 |
| 8,040,350 | B2 * | 10/2011 | Buyanovskiy | G06T 15/08 345/426 |
| 8,130,223 | B1 * | 3/2012 | Danskin | G06T 1/60 345/422 |
| 9,076,219 | B2 * | 7/2015 | Cha | G06K 9/00664 |
| 9,111,385 | B2 * | 8/2015 | Kho | G06T 15/08 |
| 9,224,235 | B2 * | 12/2015 | Sevastiyanov | G06T 9/40 |
| 9,552,664 | B2 * | 1/2017 | Laine | G06T 9/001 |
| 9,582,607 | B2 * | 2/2017 | Laine | G06T 17/10 |
| 9,842,424 | B2 * | 12/2017 | Hecht | G06T 15/08 |
| 10,054,932 | B2 * | 8/2018 | Bachrach | G05B 19/4099 |
| 10,091,490 | B2 * | 10/2018 | Sharma | G06T 17/00 |
| 10,137,644 | B2 * | 11/2018 | de Pena | B29C 64/40 |
| 10,181,216 | B2 * | 1/2019 | Zeng | G06T 17/00 |
| 10,201,961 | B2 * | 2/2019 | Zeng | B33Y 30/00 |
| 10,373,371 | B2 * | 8/2019 | Zeng | G06T 17/005 |
| 10,394,221 | B2 * | 8/2019 | Iverson | G06T 7/73 |
| 10,395,372 | B2 * | 8/2019 | Anand | G06F 30/20 |
| 10,409,263 | B2 * | 9/2019 | Donovan | H04N 1/405 |
| 10,445,929 | B2 * | 10/2019 | Morovic | H04N 1/405 |
| 10,452,055 | B2 * | 10/2019 | Morovic | G05B 19/4099 |
| 10,549,518 | B2 * | 2/2020 | Puigardeu Aramendia | B29C 64/245 |
| 10,559,086 | B1 * | 2/2020 | Miller | G06F 3/017 |
| 10,661,506 | B2 * | 5/2020 | Garcia Reyero Vinas | G06T 15/205 |
| 10,678,217 | B2 * | 6/2020 | Zeng | G06T 17/00 |
| 10,688,774 | B2 * | 6/2020 | Morovic | B33Y 50/02 |
| 10,699,359 | B2 * | 6/2020 | Oliveria Da Silva | H04N 5/2353 |
| 2002/0158867 | A1 * | 10/2002 | Bloomenthal | G06T 17/10 345/419 |
| 2002/0186216 | A1 * | 12/2002 | Baumberg | G06T 17/20 345/422 |
| 2002/0190986 | A1 * | 12/2002 | Fujiwara | G06T 17/10 345/424 |
| 2003/0001836 | A1 * | 1/2003 | Ernst | G06T 17/005 345/419 |
| 2003/0035061 | A1 * | 2/2003 | Iwaki | G06T 17/10 348/371 |
| 2003/0052875 | A1 * | 3/2003 | Salomie | G06T 17/20 345/419 |
| 2004/0122635 | A1 * | 6/2004 | Uraki | G06F 30/23 703/2 |
| 2004/0170255 | A1 * | 9/2004 | Akutsu | A61B 6/10 378/197 |
| 2004/0193392 | A1 * | 9/2004 | Williams | G06F 17/5018 703/2 |
| 2004/0267400 | A1 * | 12/2004 | Ohmori | G05B 19/4097 700/182 |
| 2005/0017971 | A1 * | 1/2005 | Ard | G06T 17/10 345/423 |
| 2005/0068317 | A1 * | 3/2005 | Amakai | G06T 7/001 345/419 |
| 2005/0113680 | A1 * | 5/2005 | Ikeda | A61B 6/504 600/425 |
| 2005/0151735 | A1 * | 7/2005 | Boekhorst | G06T 15/06 345/424 |
| 2005/0190198 | A1 * | 9/2005 | Koyama | G09G 5/06 345/593 |
| 2006/0056726 | A1 * | 3/2006 | Fujiwara | G06T 15/08 382/276 |
| 2006/0066614 | A1 * | 3/2006 | Grau | G06K 9/00369 345/423 |
| 2006/0071932 | A1 * | 4/2006 | Weese | G06T 15/08 345/424 |
| 2006/0147106 | A1 * | 7/2006 | Yang | G06T 15/08 382/154 |
| 2006/0152510 | A1 * | 7/2006 | Dick | G06T 15/08 345/440 |
| 2006/0274061 | A1 * | 12/2006 | Wang | A61N 5/103 345/420 |
| 2006/0274065 | A1 * | 12/2006 | Buyanovskiy | G06T 15/83 345/424 |
| 2006/0290695 | A1 * | 12/2006 | Salomie | G06T 17/20 345/420 |
| 2007/0014480 | A1 * | 1/2007 | Sirohey | G06T 5/00 382/240 |
| 2008/0021882 | A1 | 1/2008 | Pu et al. | |
| 2008/0118118 | A1 * | 5/2008 | Berger | G06K 9/342 382/128 |
| 2008/0238919 | A1 * | 10/2008 | Pack | G06T 17/005 345/420 |
| 2008/0259075 | A1 * | 10/2008 | Fowler | G06T 15/06 345/421 |
| 2008/0292169 | A1 * | 11/2008 | Wang | G06T 7/174 382/131 |
| 2009/0027380 | A1 * | 1/2009 | Rajan | G06T 19/20 345/419 |
| 2009/0060309 | A1 * | 3/2009 | Tsujii | G06T 15/08 382/131 |
| 2009/0096787 | A1 * | 4/2009 | Masumoto | G06T 15/08 345/424 |
| 2009/0135191 | A1 * | 5/2009 | Azar | A61B 6/502 345/522 |
| 2009/0167763 | A1 * | 7/2009 | Waechter | G06T 17/005 345/426 |
| 2009/0208075 | A1 * | 8/2009 | Fischer | G06T 7/11 382/128 |
| 2009/0292206 | A1 * | 11/2009 | Sato | A61B 8/13 600/443 |
| 2009/0312996 | A1 * | 12/2009 | Guyaguler | E21B 49/00 703/10 |
| 2010/0191757 | A1 * | 7/2010 | Noguchi | G06F 3/0608 707/758 |
| 2011/0043521 | A1 * | 2/2011 | Smyth | G06T 15/06 345/424 |
| 2011/0193859 | A1 * | 8/2011 | Kim | G06T 17/005 345/419 |
| 2011/0202510 | A1 * | 8/2011 | Salemann | G06F 16/29 707/693 |
| 2011/0285710 | A1 * | 11/2011 | Mejdrich | G06T 15/06 345/426 |
| 2011/0316855 | A1 * | 12/2011 | Mejdrich | G06T 15/06 345/420 |

(56) References Cited

U.S. PATENT DOCUMENTS

| | | | |
|---|---|---|---|
| 2012/0180000 A1* | 7/2012 | Weng | G06F 3/04815 715/848 |
| 2013/0066812 A1* | 3/2013 | Nehme | G06T 17/005 705/400 |
| 2013/0076734 A1* | 3/2013 | Rolleston | G06T 19/00 345/419 |
| 2013/0089253 A1* | 4/2013 | Chabanas | G06T 17/30 382/131 |
| 2013/0187903 A1* | 7/2013 | Papageorgiou | G06T 19/00 345/419 |
| 2013/0308849 A1* | 11/2013 | Fei | G06T 7/168 382/131 |
| 2013/0321414 A1* | 12/2013 | Algreatly | G06F 17/00 345/420 |
| 2014/0067333 A1* | 3/2014 | Rodney | G06T 19/00 703/1 |
| 2014/0176545 A1* | 6/2014 | Laine | G06T 11/40 345/424 |
| 2014/0231266 A1* | 8/2014 | Sherrer | B22D 19/00 205/136 |
| 2014/0313195 A1* | 10/2014 | Algreatly | G06T 17/20 345/423 |
| 2014/0324204 A1* | 10/2014 | Vidimce | B29C 67/0088 700/98 |
| 2014/0327667 A1* | 11/2014 | Kim | G06T 15/08 345/419 |
| 2014/0330796 A1* | 11/2014 | Dally | G06F 16/1744 707/693 |
| 2015/0084953 A1* | 3/2015 | Luo | G06T 17/00 345/420 |
| 2015/0096266 A1 | 4/2015 | Divine et al. | |
| 2015/0138201 A1* | 5/2015 | Brown | G06T 15/08 345/426 |
| 2015/0145158 A1 | 5/2015 | Levine et al. | |
| 2015/0148930 A1* | 5/2015 | Kumar | G05B 19/4099 700/98 |
| 2015/0161786 A1* | 6/2015 | Seifert | A61B 6/5205 382/119 |
| 2015/0178988 A1 | 6/2015 | Mora et al. | |
| 2015/0251357 A1 | 9/2015 | Jin et al. | |
| 2015/0262416 A1* | 9/2015 | Hecht | G06T 15/08 345/424 |
| 2015/0269282 A1* | 9/2015 | Nelaturi | G06F 30/17 700/98 |
| 2015/0269289 A1* | 9/2015 | Kim | G06F 30/20 703/6 |
| 2015/0269290 A1* | 9/2015 | Nelaturi | G06T 17/10 703/6 |
| 2015/0321425 A1 | 11/2015 | Stava | |
| 2016/0101570 A1* | 4/2016 | Iorio | G05B 19/4099 700/98 |
| 2016/0303803 A1* | 10/2016 | Hudson | G05B 19/4099 |
| 2016/0320771 A1* | 11/2016 | Huang | B29C 67/00 |
| 2016/0332388 A1* | 11/2016 | Park | B29C 71/0009 |
| 2016/0334964 A1* | 11/2016 | Jeon | G06T 15/08 |
| 2016/0337549 A1* | 11/2016 | Nuuja | H04N 1/32229 |
| 2016/0358384 A1* | 12/2016 | Marche | G01N 21/8851 |
| 2017/0039759 A1* | 2/2017 | Huet | G06T 9/001 |
| 2017/0091965 A1* | 3/2017 | Korzunov | G06T 19/00 |
| 2017/0113414 A1* | 4/2017 | Zeng | B29C 64/386 |
| 2017/0173870 A1* | 6/2017 | Condello | B29C 64/112 |
| 2017/0246812 A1* | 8/2017 | Morovic | H04N 1/605 |
| 2017/0249782 A1* | 8/2017 | Zeng | B29C 64/386 |
| 2017/0323436 A1* | 11/2017 | Foland | G06T 15/205 |
| 2017/0364316 A1* | 12/2017 | Morovic | G06F 3/1245 |
| 2017/0365095 A1* | 12/2017 | Morovic | B33Y 50/00 |
| 2017/0368755 A1* | 12/2017 | Bader | B33Y 10/00 |
| 2017/0371318 A1* | 12/2017 | Morovic | G05B 19/4099 |
| 2017/0372480 A1* | 12/2017 | Anand | G06T 19/20 |
| 2017/0372513 A1* | 12/2017 | Zeng | G06T 19/00 |
| 2018/0001566 A1* | 1/2018 | Morovic | H04N 1/405 |
| 2018/0009168 A1* | 1/2018 | Morovic | B29C 64/393 |
| 2018/0032060 A1* | 2/2018 | Zeng | G05B 19/4099 |
| 2018/0046167 A1* | 2/2018 | Iverson | G06T 17/00 |
| 2018/0052447 A1* | 2/2018 | Morovic | H04N 1/405 |
| 2018/0052947 A1* | 2/2018 | Garcia-Reyero Vinas | G06F 17/50 |
| 2018/0056640 A1* | 3/2018 | Yoshida | G06T 19/20 |
| 2018/0117897 A1* | 5/2018 | Zeng | B33Y 50/02 |
| 2018/0151254 A1* | 5/2018 | Han | G16H 10/60 |
| 2018/0240269 A1* | 8/2018 | Brenna | G06T 17/00 |
| 2018/0264722 A1* | 9/2018 | Puigardeu Aramendia | B22F 3/008 |
| 2018/0272429 A1* | 9/2018 | Delmotte | B23P 15/10 |
| 2018/0276316 A1* | 9/2018 | Brochu | G06T 17/00 |
| 2018/0276887 A1* | 9/2018 | Younas | G06T 7/12 |
| 2018/0281294 A1* | 10/2018 | Gottschalk-Gaudig | B33Y 10/00 |
| 2018/0299869 A1* | 10/2018 | Yukumoto | G06F 17/50 |
| 2018/0300947 A1* | 10/2018 | Alkhatib | G06T 17/00 |
| 2018/0304550 A1* | 10/2018 | Atherton | G05B 19/4099 |
| 2018/0307206 A1* | 10/2018 | Atherton | G05B 19/4099 |
| 2018/0307207 A1* | 10/2018 | Atherton | B23K 9/044 |
| 2018/0307443 A1* | 10/2018 | Morovic | B33Y 50/00 |
| 2018/0319087 A1* | 11/2018 | Eom | B29C 64/393 |
| 2018/0321658 A1* | 11/2018 | Whitmarsh | B33Y 50/00 |
| 2018/0348735 A1* | 12/2018 | Atherton | G05B 19/4099 |
| 2018/0349220 A1* | 12/2018 | Briggs | G06F 11/0733 |
| 2018/0354196 A1* | 12/2018 | Wu | B29C 64/386 |
| 2018/0361729 A1* | 12/2018 | Gibson | B33Y 30/00 |
| 2018/0365518 A1* | 12/2018 | Yang | G06K 9/3241 |
| 2018/0373227 A1* | 12/2018 | Sadusk | B29C 64/40 |
| 2019/0001574 A1* | 1/2019 | Yackabonis | B33Y 30/00 |
| 2019/0026953 A1* | 1/2019 | Del Angel | G06T 19/00 |
| 2019/0030816 A1* | 1/2019 | Iorio | G05B 19/4099 |
| 2019/0039368 A1* | 2/2019 | Zeng | B29C 64/386 |
| 2019/0054700 A1* | 2/2019 | Chandar | B29C 64/393 |
| 2019/0056716 A1* | 2/2019 | Ge | G06F 7/00 |
| 2019/0056717 A1* | 2/2019 | Kothari | B22F 3/1055 |
| 2019/0061231 A1* | 2/2019 | Ho | B29C 64/118 |
| 2019/0061239 A1* | 2/2019 | Liu | B29C 64/20 |
| 2019/0061277 A1* | 2/2019 | Shen | H04N 1/60 |
| 2019/0066391 A1* | 2/2019 | Anderson | G06T 19/20 |
| 2019/0070785 A1* | 3/2019 | Kothari | B29C 64/386 |
| 2019/0102516 A1* | 4/2019 | Schieke | G16H 30/40 |
| 2019/0111590 A1* | 4/2019 | Trivedi | B29C 33/3814 |
| 2019/0122427 A1* | 4/2019 | Zeng | G06T 9/40 |
| 2019/0130525 A1* | 5/2019 | Mou | G06T 3/0012 |
| 2019/0130642 A1* | 5/2019 | Elber | G06T 17/10 |
| 2019/0134970 A1* | 5/2019 | Zeng | B29C 64/393 |
| 2019/0138670 A1* | 5/2019 | Bandara | G06F 17/5009 |
| 2019/0180503 A1* | 6/2019 | Karasudani | G06T 17/20 |
| 2019/0228578 A1* | 7/2019 | Moschini | B29C 64/106 |
| 2019/0236850 A1* | 8/2019 | Li | G06F 21/16 |
| 2019/0243336 A1* | 8/2019 | Joy | G05B 17/02 |
| 2019/0251743 A1* | 8/2019 | Koyama | G01C 21/36 |
| 2019/0362543 A1* | 11/2019 | Zeng | G06T 17/00 |
| 2020/0047414 A1* | 2/2020 | Kothari | B33Y 10/00 |
| 2020/0050175 A1* | 2/2020 | Carruesco Llorens | G06T 17/005 |
| 2020/0105058 A1* | 4/2020 | Shin | G06T 15/06 |
| 2020/0158514 A1* | 5/2020 | Moloney | G05D 1/0214 |
| 2020/0167997 A1* | 5/2020 | Shin | G06T 17/05 |
| 2020/0257268 A1* | 8/2020 | Zeng | G06T 17/00 |
| 2020/0288161 A1* | 9/2020 | Wang | H04N 19/96 |
| 2020/0320747 A1* | 10/2020 | Izumi | G06T 19/00 |

OTHER PUBLICATIONS

Krassenstein, E. "3Dprinttech: Free Software Released to 3D Print Objects Larger Than Printer's Build Volume", Jul. 27, 2014.

* cited by examiner

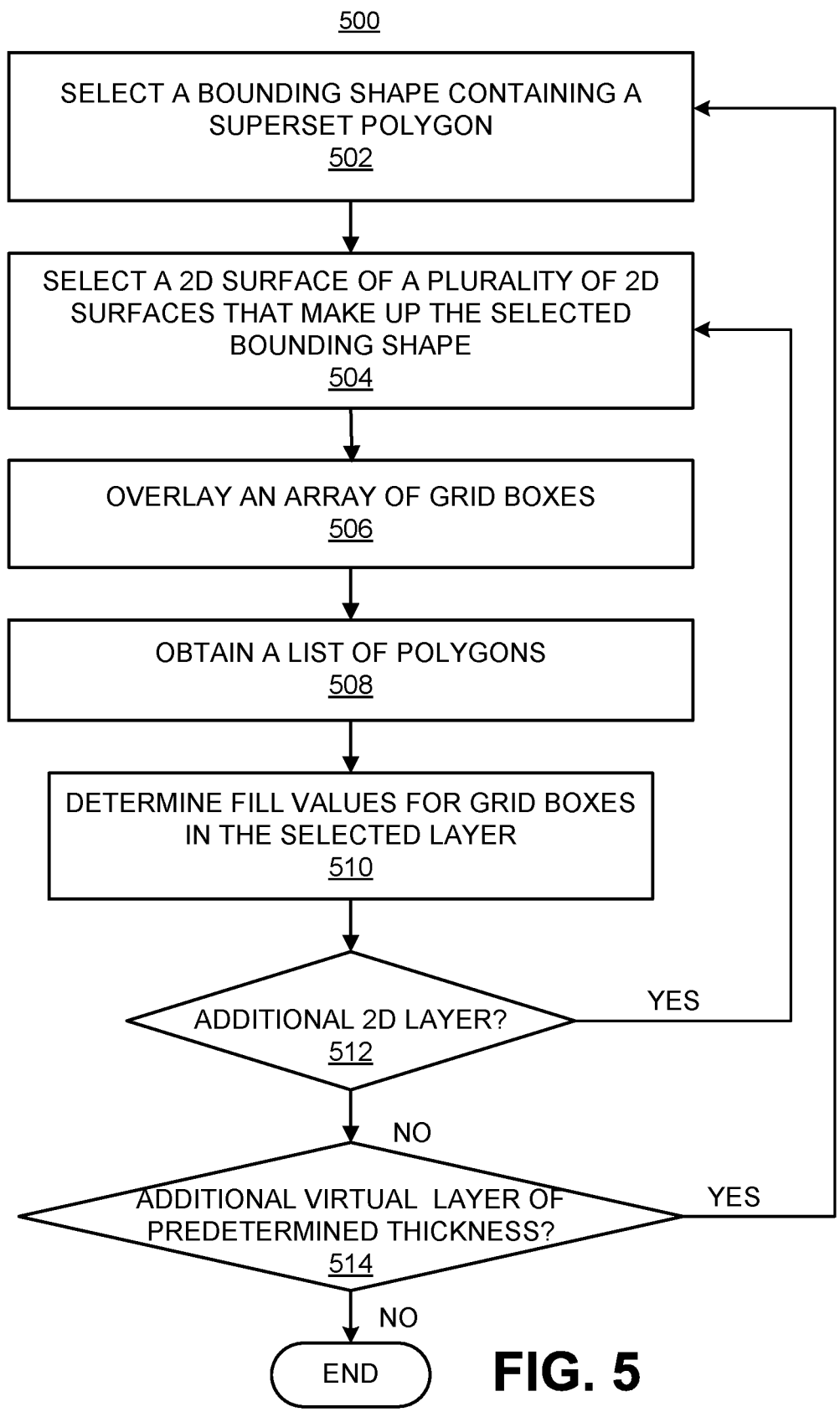

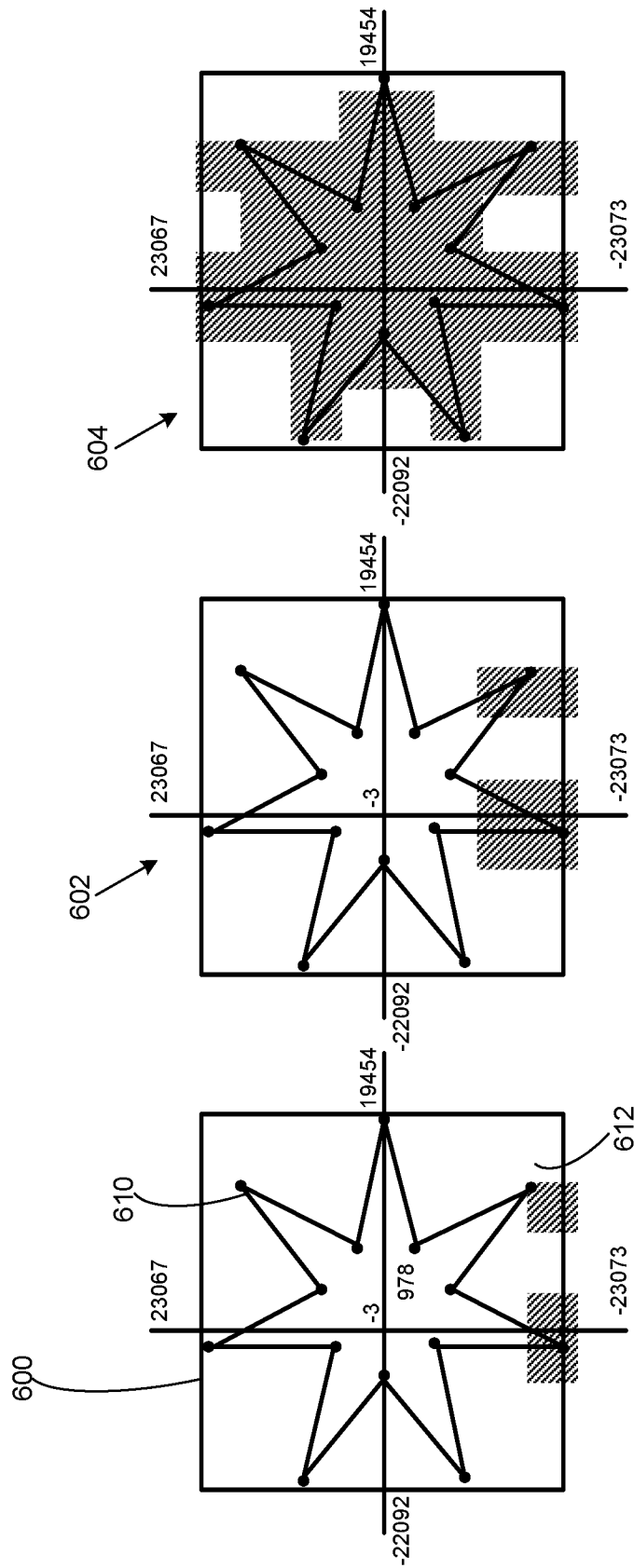

GENERATING A SHAPE PROFILE FOR A 3D OBJECT

BACKGROUND 3D (three-dimensional) manufacturing systems typically employ additive manufacturing techniques to build or print parts within a 3D build envelope of the 3D manufacturing system. As individual parts typically do not require the entire 3D build envelope, 3D manufacturing systems are often operated to build multiple distinct parts within the build envelope concurrently during a common build operation.

BRIEF DESCRIPTION OF THE DRAWINGS

Features of the present disclosure are illustrated by way of example and not limited in the following figure(s), in which like numerals indicate like elements, in which:

FIG. 5 shows a flowchart of an example method of further partitioning partitioned boundary shapes;

FIGS. 6A-6C, respectively, show an example mapping of an array of grid boxes onto a surface of a boundary shape.

DETAILED DESCRIPTION

Figure 1:
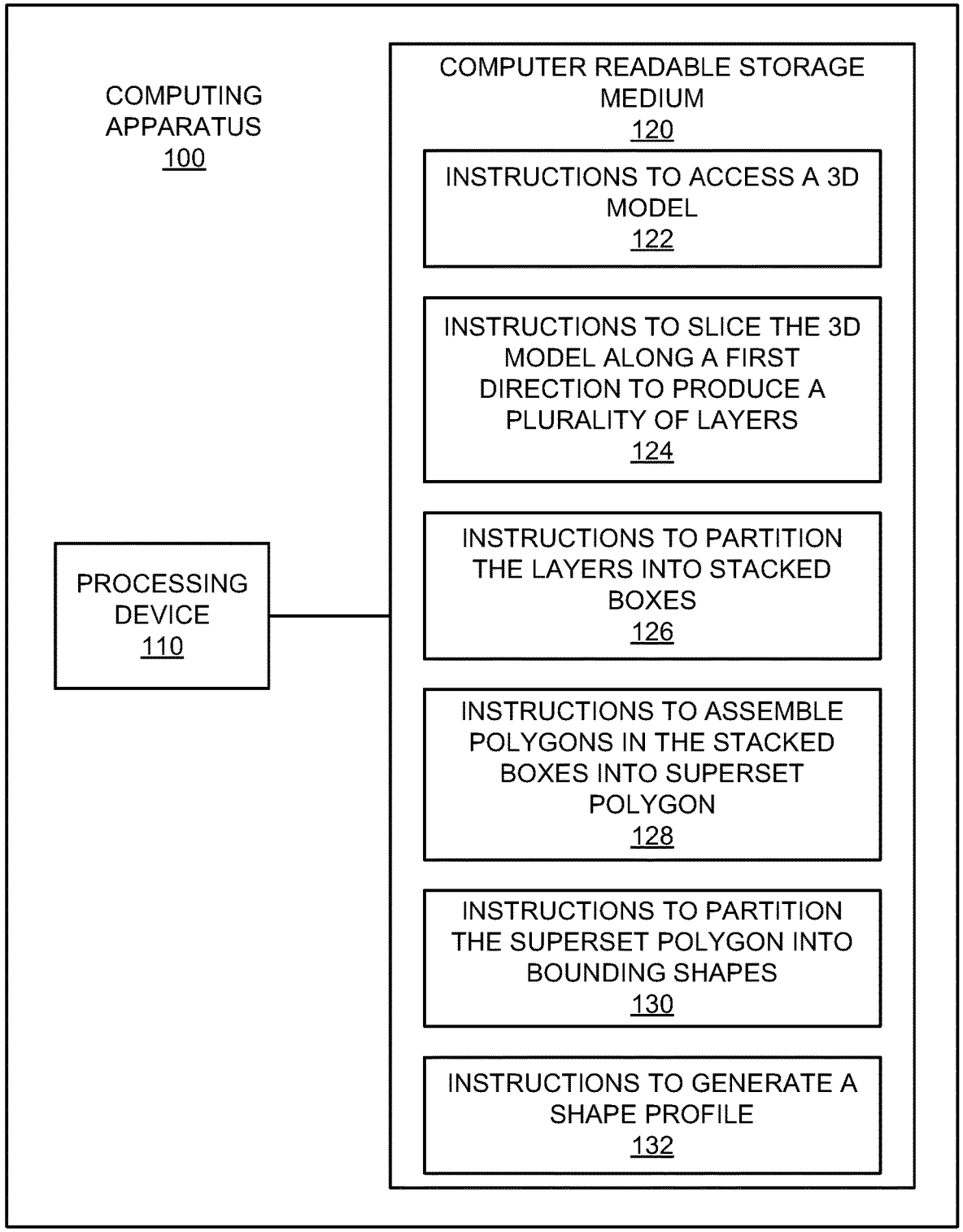
FIG. 1 is a block diagram of an example computing apparatus for generating a shape profile for a 3D object.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Industrial grade 3D printers have large build volumes so that print service providers (PSPs) that need to produce many discrete and oftentimes different, complex parts have the necessary high throughput. In a typical industrial setting, a 3D printer may produce hundreds of parts (or equivalently, 3D objects) in a batch, and each part may have tens of thousands of geometrical entities to be analyzed. In order to achieve the required high throughput, the printing process may be optimized between printing large quantities of geometrical entities requiring analysis of complex shapes while simultaneously providing a quick turn-around. Printing applications may also include multiple data pipeline applications that may demand quick computations. For example, when optimally orienting and placing many different parts into the same build volume (parts packaging) it can be challenging to apply all the geometrical entities precisely within the build volume given the limited computing resources. Cage generation and cloud-based build bed previews and modifications are other processes that may also require fast computations.

Disclosed herein are apparatuses and methods for generating shape profiles for 3D objects, for instance, 3D objects that are to be printed. The shape profiles for the 3D objects may include geometrical entities that closely approximate the shapes of 3D objects. That is the shape profiles may have a significantly smaller number of geometrical entities that approximate the shapes of the 3D objects than the actual shapes of the 3D objects. In one regard, therefore, computations implementing the shape profiles may be significantly faster than computations implementing more accurate geometrical entities of the actual 3D objects.

The generated shape profiles may be used in the optimization of packaging of parts for 3D printing so that a significant reduction in geometric entities of shapes may be achieved, which in turn may enable faster computing and efficient data transmission even while ensuring accuracy of prints. Particularly, the methods disclosed herein may include the partitioning of layers into a plurality of stacked boxes, in which the stacked boxes include respective polygons that represent portions of a 3D model. In addition, for each of the stacked boxes, the polygons in the stacked box may be assembled into a superset polygon and the superset polygon may be partitioned into bounding shapes. The bounding shapes may be further partitioned in multiple directions to form cells that contain fill values corresponding to the polygons contained in the cells. That is, for instance, the bounding shapes may be further partitioned based upon computed volume errors and replacement of the partitioned bounding shapes with further partitioned bounding shapes. In addition, the shape profile of a 3D model may be generated from the formed cells, in which the cells may have any suitable geometrical shapes such as cubes, honeycombs, triangles, tetrahedrons, etc. For instance, the cells may have any geometrical shapes that may be used to discretize a solid object. The shape profile disclosed herein may define a geometry corresponding to the plurality of stacked boxes.

Through implementation of the methods and computing apparatuses disclosed herein to generate shape profiles, the amount of time and processing power that 3D printers may require to process a plurality of 3D objects for printing may be significantly reduced by using the generated shape profiles over other processing techniques. In addition, the amount of storage space required to store profiles of the 3D objects may be significantly reduced, which may also result in greater efficiency in the operations of the 3D printers and/or data storage devices. As discussed herein, in an example, the computing apparatuses may be included in or may be 3D printers and may thus generate shape profiles, implement the generated shape profiles (e.g., use the shape profiles in parts packaging and/or cage generation operations), and may print 3D objects using the generated shape profiles.

Referring now to the figures, FIG. 1 is a block diagram of an example computing apparatus 100 for generating a shape profile for a 3D model. It should be understood that the computing apparatus 100 depicted in FIG. 1 may include additional components and that some of the components described herein may be removed and/or modified without departing from a scope of the computing apparatus 100.

The computing apparatus 100 is depicted as including a processing device 110 and a non-transitory computer readable storage medium 120. The processing device 110 may fetch, decode, and execute processor-readable instructions, such as instructions 122-132 stored on the computer readable storage medium 120, to control various processes for generating a shape profile of a 3D model. As an alternative or in addition to retrieving and executing instructions, the processing device 110 may include one or more electronic circuits that include electronic components for performing the functionalities of the instructions 122-132.

The processing device 110 may execute the instructions 122 to access a 3D model of a 3D object that is to be 3D printed. The processing device 110 may access the 3D model and/or information regarding the 3D model from an external device or the information may be retrieved from a local data store (not shown). In one example, the 3D object may be a unitary piece composed of a plurality of sections and extending along first, second and third directions, for example, the X, Y, and Z directions of a Cartesian coordinate system. By the way of illustration and not limitation, the second and third directions may extend along the length and breadth of a build area platform (not shown) of a 3D printer while the first direction may extend normal to a plane formed along the second and the third directions along the height of a build volume (or build direction) in which the 3D printer builds the 3D object.

The processing device 110 may execute the instructions 124 to slice the 3D model along a first direction to produce a plurality of layers in parallel planes that are defined across the second and third directions. For instance, the first, second, and third directions are orthogonal to each other similar to a Cartesian coordinate system. Each of the layers may thus be sliced through the 3D model such that each of the layers is composed of polygons that represent portions or sections of the 3D model. The polygons in a layer may be contours of the 3D model in that layer. In addition, the polygons may be marked, for instance, using an ordering of nodes in a clockwise or counter-clockwise manner, to be in one of two groups. The first group may be an outer contour group, in which the inside of which is solid and so represents interior portions of the 3D model. The second group may be an inner contour group, in which the inside of which is a hole.

According to an example, each of the layers may be generated to have the same thickness and the thickness may be of a predetermined size. For instance, the thickness of each of the layers may be based upon a printing resolution of a 3D printer that is to print the 3D object, e.g., around 100 microns. In other examples, the thickness of each of the layers may be relatively larger, e.g., around 1 millimeter. In still further examples, the thickness of each of the layers may be user-defined. In another example, the thicknesses of the layers may not be constant, i.e., may not be the same with respect to each other. Instead, the layers may be generated to have different thicknesses with respect to each other.

The processing device 110 may execute the instructions 126 to partition the plurality of layers into a plurality of stacked boxes containing the respective polygons. According to an example, the spaces between the locations at which the layers have been sliced may be construed as the stacked boxes. In this regard, because the polygons representing features of the 3D model are contained in those locations, the stacked boxes may also contain the respective polygons.

The processing device 110 may execute the instructions 128 to, for each of the stacked boxes, assemble the polygons in the stacked box into a superset polygon. For instance, for a particular stacked box, the processing device 110 may assemble the polygons in that stacked box together to form the superset polygon, or a polygon that includes all of the polygons in the stacked box.

The processing device 110 may execute the instructions 130 to, for each of the stacked boxes, partition the superset polygon into bounding shapes. For instance, the processing device 110 may partition the superset polygon into a plurality of bounding shapes such that each of the bounding shapes includes a polygon from the superset polygon. As discussed in greater detail herein below, the bounding shapes may be formed through an iterative partitioning operation based upon computed volume errors in the partitioned bounding shapes. In addition, the bounding shapes may include any suitable geometric shape including, but not limited to square boxes, rectangular boxes, triangular shaped boxes, octagon shaped boxes, etc. For instance, the bounding shapes may be any geometrical entity that may be used to discretize a solid object. Moreover, the sizes of the bounding shapes may be varied and may be based upon user input. For instance, a user may define the resolution at which the bounding shapes are generated to control the amount of storage space occupied by a shape profile generated using the bounding shapes.

The processing device 110 may also execute the instructions 132 to generate a shape profile of the 3D object using the bounding shapes. The shape profile may include the bounding shapes arranged together according to the polygons of the 3D model contained in the bounding shapes. In addition, the amount of storage space required by the shape profile may depend upon the resolution of the shape profiles, which, as discussed above, may be user-defined. The shape profile of the 3D object may be a graphical representation of the generated bounding shapes and/or a data representation of the bounding shapes.

According to an example, the processing device 110 may store the generated shape profile in a local data store and/or may communicate the generated shape profile to a 3D printer. Additionally, a plurality of the generated shape profiles may be used in a packing operation that may be implemented to determine an arrangement at which a plurality of 3D objects are to be printed in a build envelope of a 3D printer. Particularly, the packing operation may be implemented to determine how the generated shape profiles may be arranged to maximize the number of 3D objects that may be printed in the build envelope during a single printing operation. In one regard, by using the shape profiles of the 3D objects instead of the 3D models, the computational requirement and the time to execute the packing operation may be significantly reduced. In one example, the processing device 110 may implement the packing operation using the generated shape profiles. In another example, a separate processing device may implement the packing operation using the shape profiles generated by the processing device 110.

The computing apparatus 100 may be a computing device, such as a personal computer, a server computer, a printer, a 3D printer, a smartphone, a tablet computer, etc. The processing device 110 may be any of a central processing unit (CPU), a semiconductor-based microprocessor, an application specific integrated circuit (ASIC), and/or other hardware device suitable for retrieval and execution of instructions stored in the computer readable storage medium 120. The computer readable storage medium 120 may be any electronic, magnetic, optical, or other physical storage device that contains or stores executable instructions. Thus, the computer readable storage medium 120 may be, for example, Random Access Memory (RAM), an Electrically Erasable Programmable Read-Only Memory (EEPROM), a storage device, an optical disc, and the like. In some implementations, the computer readable storage medium 120 may be a non-transitory computer readable storage medium, where the term "non-transitory" does not encompass transitory propagating signals.

Although not shown, the computing apparatus 100 may include a data store to which the processing device 110 may be in communication. The data store may be volatile and/or non-volatile memory, such as DRAM, EEPROM, MRAM, phase change RAM (PCRAM), memristor, flash memory, and the like. The computing apparatus 100 may further include an input/output interface (not shown) through which the processing device 110 may communicate with an external device(s) (not shown), for instance, to receive and store the information pertaining to the 3D objects, e.g., 3D models, user-defined resolution values, etc. The input/output interface may include hardware and/or software to enable the processing device 110 to communicate with the external device(s). The input/output interface may enable a wired or wireless connection to the output device(s). The input/output interface may further include a network interface card and/or may also include hardware and/or software to enable the processing device 110 to communicate with various input and/or output devices, such as a keyboard, a mouse, a display, another computing device, etc., through which a user may input instructions into the apparatus 100.

Figure 2:
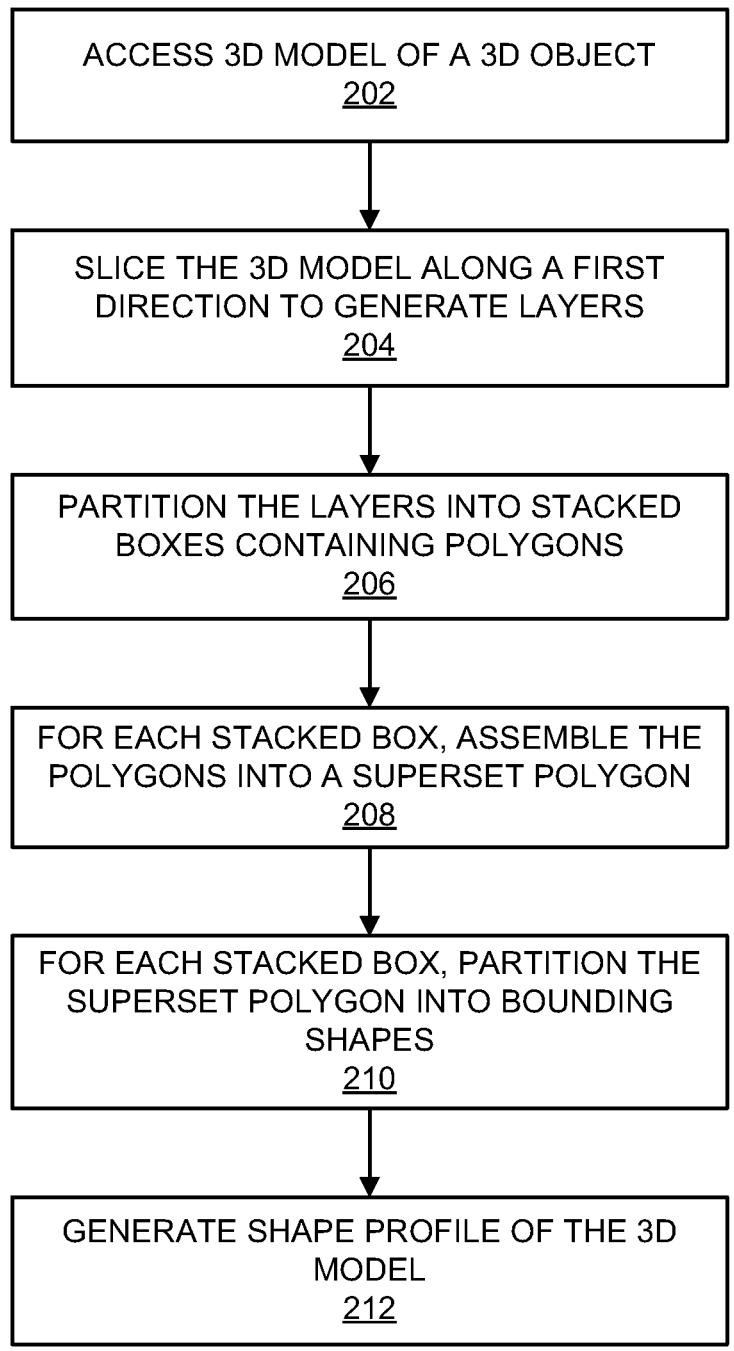
FIG. 2 depicts an example method for generating a shape profile for a 3D model.
Figure 3:
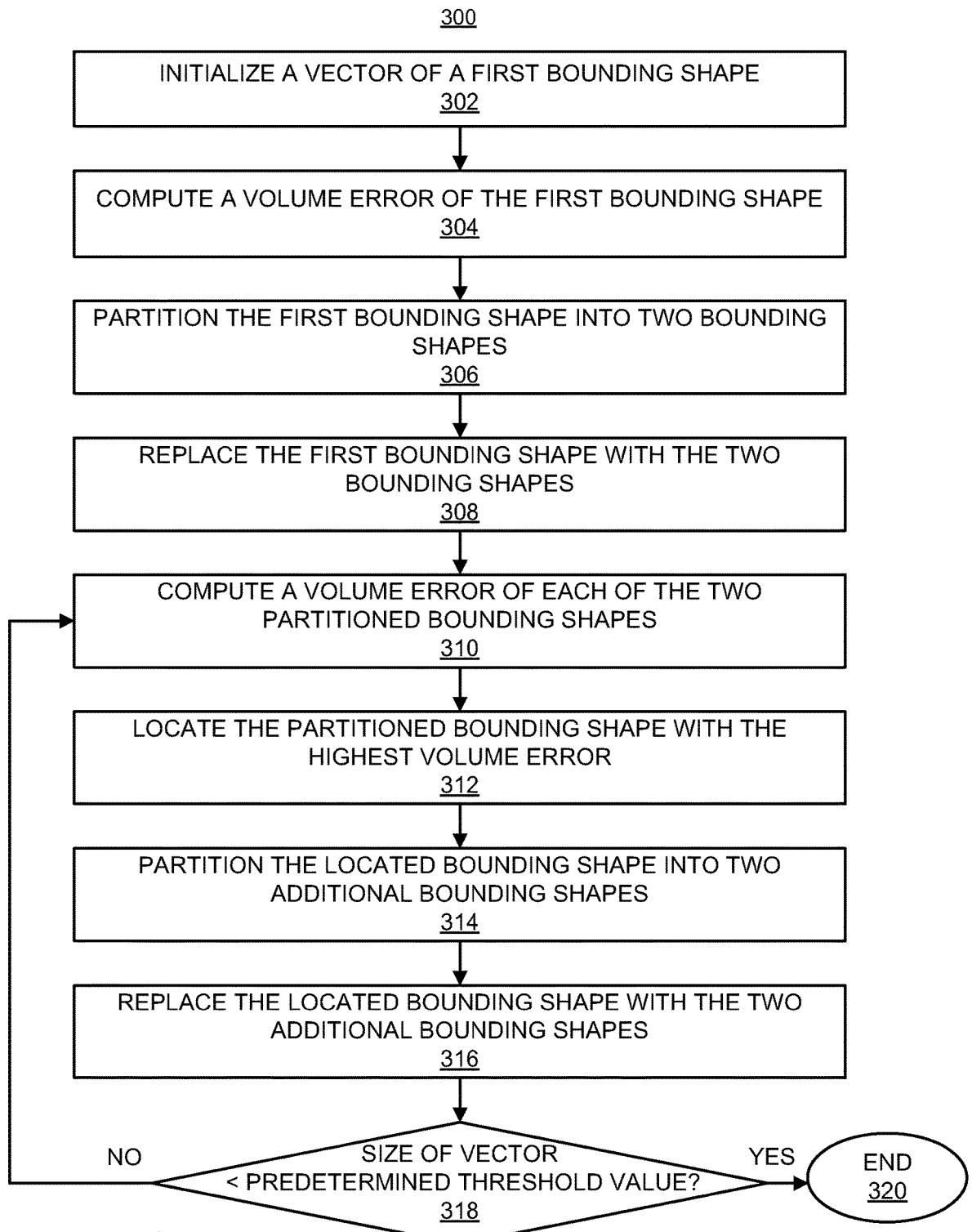
FIG. 3 shows an example method for partitioning superset polygons into bounding shapes.

Various manners in which the computing apparatus 100 may be implemented are discussed in greater detail with respect to the methods 200 and 300 respectively depicted in FIGS. 2 and 3. Particularly, FIG. 2 depicts an example method 200 for generating a shape profile for a 3D model and FIG. 3 depicts an example method 300 for partitioning superset polygons into bounding shapes. It should be apparent to those of ordinary skill in the art that the methods 200 and 300 may represent generalized illustrations and that other operations may be added or existing operations may be removed, modified, or rearranged without departing from the scopes of the methods 200 and 300.

The descriptions of the methods 200 and 300 are made with reference to the computing apparatus 100 illustrated in FIG. 1 for purposes of illustration. It should, however, be clearly understood that computing apparatuses having other configurations may be implemented to perform either or both of the methods 200 and 300 without departing from the scopes of the methods 200 and 300.

With reference first to FIG. 2, at block 202, a 3D model of a 3D object may be accessed. For instance, the processing device 110 may execute the instructions 122 to access the 3D model, which may be a graphical representation of a 3D object that a 3D printer is to print, data pertaining to the physical parameters of the 3D object, or the like. In addition, the processing device 110 may access the 3D model from a local data storage or may receive the 3D model from an external source.

At block 204, the processing device 110 may execute the instructions 124 to slice the 3D model along a first direction to generate a plurality of layers in the 3D model. The first direction may be, for instance, the z-direction in the Cartesian coordinate system and each of the plurality of layers may extend along respective parallel planes that are defined across a second direction and a third direction. The second direction may be the x-direction and the third direction may be the y-direction in the Cartesian coordinate system. Each of the layers may thus be sliced through the 3D model such that each of the layers is composed of polygons that represent portions or sections of the 3D model. The polygons in a layer may be contours of the 3D model in that layer as discussed above. In addition, each of the layers may have the same thickness or different thicknesses as discussed above.

Figure 4A:
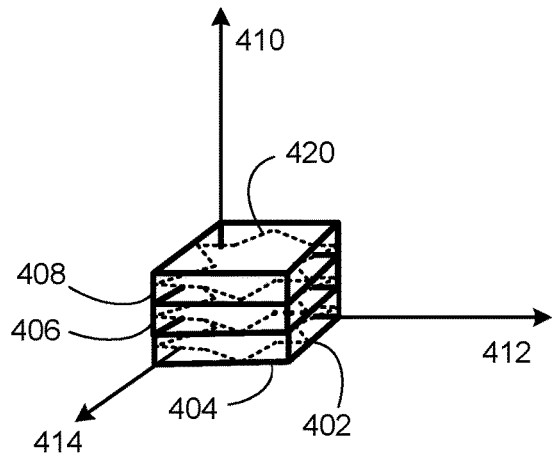
FIGS. 4A-4F illustrate example diagrams depicting various stages of bounding shape formation and partitioning.

An example of a 3D model 402 is depicted in FIG. 4A and may be used to illustrate some of the features of the method 200. As shown in FIG. 4A, the 3D model 402 may be sliced into a plurality of layers 404-408 such that each of the layers 404-408 has the same thickness with respect to each other. However, the layers 404-408 may have different thicknesses with respect to each other. As noted above, layers 404-408 may have a thickness that varies from about 100 microns to about 1 millimeter. As also shown in FIG. 4A, the layers 404-408 may be stacked in a first direction 410 and extend along respective parallel planes that are defined across a second direction 412 and a third direction 414. The directions 410-414 are depicted as being orthogonal to each other and may correspond to the axes of a Cartesian coordinate system.

In addition, each of the layers 404-408 is depicted as being composed of respective polygons 420, which are shown in dashed lines. That is, for instance, each of the layers 404-408 may include polygons that represent respective portions of the 3D model 402.

At block 206, the processing device 110 may execute the instructions 126 to partition the plurality of layers into a plurality of stacked boxes containing the respective polygons. According to an example, the spaces between the locations at which the layers have been sliced may be construed as the stacked boxes. In this regard, because the polygons representing features of the 3D model are contained in those locations, the stacked boxes may also contain the respective polygons. Various manners in which the layers may be partitioned into stacked boxes is described in greater detail below with respect to the method 300.

At block 208, the processing device 110 may execute the instructions 128 to, for each of the stacked boxes, assemble the polygons in the stacked box into a superset polygon. For instance, for a particular stacked box, the processing device 110 may assemble the polygons in that stacked box together to form the superset polygon. The superset polygon may be a polygon that includes all of the polygons in the stacked box. As shown in FIG. 4A, each of the layers 404-408 may represent a respective stacked box and the polygons 420 in each of the stacked boxes may be a respective superset polygon.

At block 210, the processing device 110 may execute the instructions 130 to, for each of the stacked boxes, partition the superset polygon into bounding shapes. For instance, the processing device 110 may partition the superset polygon into a plurality of bounding shapes such that each of the bounding shapes includes a polygon from the superset polygon. As discussed in greater detail herein below with respect to the method 300 in FIG. 3, the bounding shapes may be formed through an iterative partitioning operation based upon computed volume errors in the partitioned bounding shapes. In addition, as discussed above, the bounding shapes may include any suitable geometric shape, the sizes of the bounding shapes may be varied, and the sizes may be based upon user input.

According to an example, the processing device 110 may apply a padding to enlarge the superset polygon in the stacked boxes and the processing device 110 may partition the enlarged superset polygon. In one regard, the enlarged superset polygon may cause the shape profile generated for the 3D object to be relatively larger than the 3D object to, for instance, provide padding between the 3D object and another 3D object in a build envelope of a 3D printer. The padding may be uniform in thickness or may have user-defined forms. For instance, certain geometrical features may be provided with more padding to increase insulation from neighboring 3D objects. In this case, the padding thickness may depend on the geometrical features of the 3D object. The padding thickness may also depend on the particular materials used in building the 3D object or the portions of the 3D object containing the geometrical features. In an example in which a 3D object is formed of multiple materials, different applied materials may require different insulation thicknesses to be decoupled from neighboring 3D objects.

At block 212, the processing device 110 may execute the instructions 132 to generate a shape profile of the 3D object using the bounding shapes. The shape profile may include the bounding shapes arranged together according to the arrangement of the polygons of the 3D model contained in the bounding shapes. In addition, the amount of storage space required by the shape profile may depend upon the resolution of the shape profiles, which, as discussed above, may be user-defined. The shape profile of the 3D object may be a graphical representation of the generated bounding shapes and/or a data representation of the bounding shapes. For instance, the shape profile may include various values to identify the locations of the bounding shapes.

According to an example, the volume error for each of the layers forming the stacked boxes may be computed and recorded. Thus, for instance, at block 304, the volume errors for each of the layers may be computed and the volume error for the first bounding shape may be computed from the computed volume errors of each of the layers. For instance, the volume error for the first bounding shape may be computed by adding the volume errors of the layers contained in the bounding shape. By way of example, the volume errors for each of the layers 404, 406, and 408 may be computed and recorded and the volume error for the bounding shape 430 may be computed by adding up the volume errors for each of the layers 404, 406, and 408. Moreover, as discussed in greater detail herein below, as the bounding shape is further partitioned, the volume errors of the further partitioned bounding shapes may be computed by adding the volume errors of the layers contained in the partitioned bounding shapes. In one regard, by initially computing the volume errors for the layers, the volume errors for the partitioned bounding shapes may be computed in a relatively quick and efficient manner.

Shown below is an example program flow for computing the volume error of a bounding shape:

```
float * getVolumeErrs(int i0, int i1) {
    //[i0, i1] defines a section of continuous layers (this virtual bounding
box)        bounding shape volume: compute the largest extents (X/Y
min/max) for all 2-D virtual layers for all sliced layers [i0, i1]. Multiply by the height
- H*(i1-i0+1).
             3D object volume: Sum all 2D layers area for all sliced layers
[i0, i1], then multiply by slice layer thickness.
             Volumeerror = bounding shape volume - 3D object volume
    Return Volumeerror
        }.
```

With reference now to FIG. 3, there is shown an example method 300 for partitioning superset polygons into bounding shapes. In other words, the method 300 may depict an example of operations that may be performed at block 210 in the method 200 depicted in FIG. 2. According to an example, the processing device 210 may execute the instructions 126 to perform the operations described with respect to the method 300.

Figure 4B:
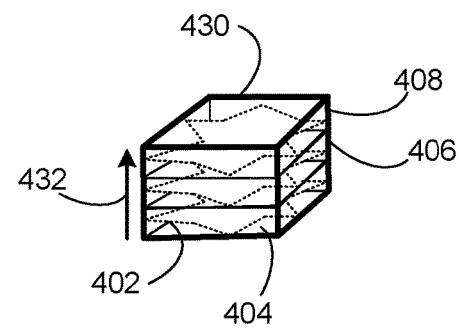

At block 302, a vector of a first bounding shape that is defined by a first layer and a last layer of the plurality of layers forming the stacked boxes may be initialized. For instance, the first bounding shape may extend from the first layer to the last layer in which the stacked boxes are formed. An example of a first bounding shape 430 is depicted in FIG. 4B. As shown in that figure, the first bounding shape 430 has a rectangular shape and encompasses the first layer 404, the second layer 406, and the third layer 408. In other words, the first bounding shape 430 is defined by the layers 404-408 that form the stacked boxes. Also shown in that figure is a vector 432 that has a size that equivalent to the height of the bounding shape 430.

At block 304, a volume error of the first bounding shape may be computed. The volume error may be defined as the difference between a volume of a bounding shape and a volume of portion of the 3D object contained in the bounding shape. In this regard, and with reference to FIG. 4B, the volume error of the first bounding shape 430 may be computed by computing the volume of the first bounding shape 430 and the volume of the 3D object 402 contained in the first bounding shape 430 and subtracting the volume of the 3D object 402 from the volume of the first bounding shape 430.

At block 306, the first bounding shape may be partitioned into two bounding shapes. For instance, the first bounding shape may be partitioned into two bounding shapes by splitting the first bounding shape such that each of the partitioned bounding shapes have similar volume errors with respect to each other. In other words, the first bounding shape may be partitioned such that the difference in volume errors between the partitioned bounding shapes is minimized. As discussed above, the volume errors for each of the partitioned bounding shapes may be computed by adding up the previously computed volume errors of the layers contained in each of the partitioned bounding shapes. In addition, the first bounding shape may be partitioned along a plane that extends across the second 412 and the third 414 directions and through a layer.

Shown below is an example program flow for a bi-partition methodology which may be used to select the partition plane of a bounding shape to partition the bounding shape:

```
int bipartition (int i0, int i1, float *err) {
    //i0 & i1 are starting/ending layer IDs for the section that is to be
    partitioned via the binary partitioning
    //returns the ID of the partition layer
        head = i0
        tail = i1
    while (tail-head)>0 {
        ip = 0.5*(head + tail)
        err[0] = getVolumeErrs(i0, ip)
        err[1] = getVolumeErrs(ip, i1)
        if ((err[0] - err[1]>tolerance) {tolerance can be
        0.1*totalVollume
            tail = ip
```

-continued

```
    }
    else if ((err[1] - err[0])>tolerance) {
        Head = ip
    }
    else {
        Return ip
    }
```

Figure 4C:
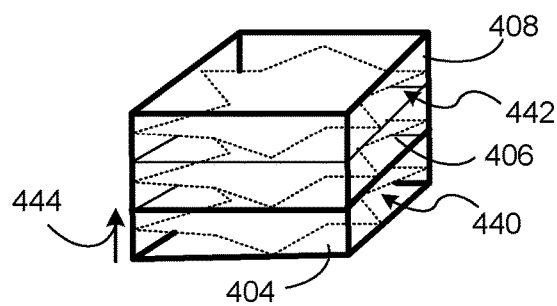

At block 308, the first bounding shape in the stacked boxes may be replaced with the two partitioned bounding shapes. An example of the partitioned bounding shapes replacing the first bounding shape 430 is shown in FIG. 4C, which depicts the partitioned bounding shapes as elements 440 and 442. As shown, one of the partitioned bounding shapes 440 may include a first stacked box 404 and the other partitioned bounding shape 442 may include the second stacked box 406 and the third stacked box 408. As also shown in FIG. 4C, a vector 444 depicting a size of the partitioned bounding shape 440 is relatively smaller than the vector 432 depicting the size of the first bounding shape 430.

At block 310, a volume error of each of the two partitioned bounding shapes may be computed. As discussed above, the volume error of a partitioned bounding shape may be computed by adding up the previously computed volume errors of the layers contained in the partitioned bounding shape.

At block 312, the partitioned bounding shape having the highest volume error may be located. Thus, for instance, a determination may be made as to which of the partitioned bounding shapes 440 and 442 has the highest volume error. If the bounding shapes 440 and 442 have the same volume error, one of the bounding shapes 440 and 442 may be selected at random.

Figure 4D:
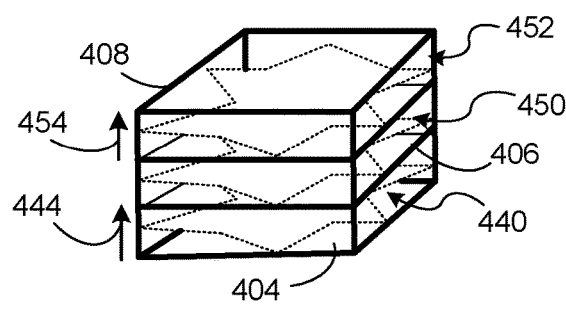

At block 314, the located bounding shape having the highest volume error may be partitioned into two additional bounding shapes. In addition, at block 316 the located bounding shape in the stacked boxes may be replaced with the two additional bounding shapes. An example of the additionally partitioned bounding shapes 450 and 452 replacing one of the partitioned bounding shapes 442 is depicted in FIG. 4D. As shown, one of the additionally partitioned bounding shapes 450 may include the second stacked box 406 and the other additionally partitioned bounding shape 452 may include the third stacked box 408. As also shown in FIG. 4D, a vector 454 depicting a size of the additionally partitioned bounding shape 450 may be the same as than the vector 444 depicting the size of the partitioned bounding shape 440.

At block 318, a determination may be made as to whether the size of the vector is less than a predetermined threshold value. For instance, a determination may be made as to whether the size of the smallest vector depicting the size of a partitioned bounding shape is smaller than a predetermined threshold value. The predetermined threshold value may be equivalent to the thickness of the layers 404-408 and may thus correspond to the resolution at which the 3D model is initially partitioned into the layers 404-408.

In response to a determination that the size of the vector is greater than or equal to the predetermined threshold value, blocks 310-318 may be repeated. Thus, for instance, the partitioned bounding shape 440 depicted in FIG. 4D may be additionally partitioned because that bounding shape 440 may have the highest volume error. In addition, blocks 310-318 may be repeated until a determination is made at block 318 that the size of the smallest vector defining a size of a partitioned bounding shape is smaller than the predetermined threshold value, at which point the method 300 may end as indicated at block 320. A result of implementing the method 300 may be that a plurality of partitioned bounding shapes that contain polygons representing the 3D object 402 and extend along parallel planes across two-axes may be identified.

Figure 4E:
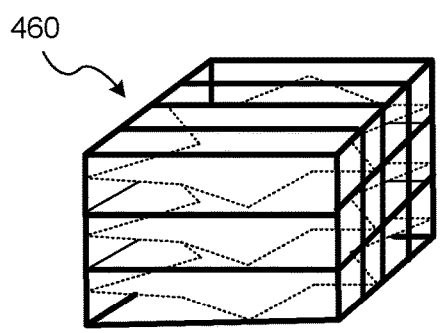

Various operations of the method 300 may also be implemented to further partition the bounding shapes in the other two directions 412 and 414. That is, for instance, the processing device 110 may execute the instructions 130 to partition the superset polygon in the respective stacked boxes into partitioned bounding shapes through implementation of various operations of the method 300 on each of the partitioned bounding shapes. By way of example and with reference back to FIG. 4D, following implementation of the method 300, a plurality of partitioned bounding shapes 440, 450, and 452 may be identified. The processing device 110 may, for each of the partitioned bounding shapes 440, 450, and 452, further partition the partitioned bounding shape 440, 450, 452 along second planes, for instance, planes that extend vertically across the first 410 and second 412 directions as shown in the diagram 460 in FIG. 4E.

The processing device 110 may thus execute blocks 306-320 on each of the partitioned bounding shapes to further partition the bounding shapes along second planes. In addition, the processing device 110 may execute blocks 306-320 on each of the further partitioned bounding shapes along third planes, e.g., planes that extend along the first 410 and third 414 directions. An example of the further partitioned bounding shapes is shown in the diagram 470 in FIG. 4F. As shown in that figure, the further partitioned bounding shapes may be individual cells 472 having cube shapes. In addition, each of the cells 472 may include a polygon of the superset polygon contained in the stacked boxes. However, it should be noted that the cells 472 may be formed to have other geometric shapes, such as, honeycomb shapes, triangular shapes, etc.

The resolutions at which the cells 472 may be formed may be user-defined. For instance, a user may specify resolution values (NX, NY, NZ) along the first, second and the third directions for example, the X, Y, and Z directions. Higher values for the resolution values (NX, NY, NZ) may result in better body-fitted resolutions, which entail more geometrical entities being analyzed. The ceiling limit which limits the maximum number of spatial points to be processed may be denoted by (NX+1)*(NY+1)*(NZ+1). By specifying the resolution values in the three directions, the user may be able to direct control over the trade-off between quality of the shape profile and the payload (number of geometrical entities). Hence, the computing apparatus 100 may be used for a large spectrum of applications ranging from packing procedures that generally specify a particular number of geometric entities for processing to caging procedures where higher resolution is preferred.

Although the simple design of the 3D object 402 may result in the bounding shapes containing the polygons having a rectangular or square shaped outline, other 3D object designs may result in the bounding shapes having more complicated outlines. An example of a plurality of bounding shapes formed through implementation of the method 300 by partitioning the bounding shapes along multiple planes is depicted in the diagrams shown in FIG. 7. As may be determined from that figure, the bounding shapes may follow the outline of the 3D object. In addition, although the bounding shapes have been described and depicted as being square or rectangular shaped boxes, it should be understood that the bounding shapes may have other suitable shapes, including, triangular, hexagonal, octagonal, etc.

According to another example, following implementation of the method 300 for one plane direction, the processing device 110 may further partition the partitioned bounding shapes through a separate operation other than the ones used in the method 300. For instance, and with reference to FIG. 5, there is shown a flowchart of another example method 500 of further partitioning the partitioned boundary shapes in the other two directions. That is, the processing device 110 may further partition each of the boundary shapes, which have been partitioned along a first direction, in the other two directions in a manner that does not include the operations recited in the method 300. In one regard, the processing device 110 may implement the method 500 following implementation of the method 300.

The processing device 110 may execute the instructions 130 to partition the superset polygon into bounding shapes to implement the method 500. That is, the processing device 110 may partition the superset polygons in each of the bounding shapes generated through implementation of the method 300 along each of the other two directions.

At block 502, a bounding shape containing a superset polygon may be selected. For instance, with respect to FIG. 4D, the top bounding shape 452 may be selected. As also shown in that figure, the top bounding shape 452 may be formed of a 2D top surface and a 2D bottom surface that form the bounding shape 452. At block 504, one of the top 2D surface and the bottom 2D surface may be selected. It should be noted that the outline of the part of the 3D object 402 that extends through the selected surface may be identified in the 2D surface. An example of a 2D surface 600 containing the outline 602 of the part of the 3D object 402 is shown in FIGS. 6A-6C.

At block 506, an array of grid boxes may be overlaid or mapped on the selected 2D surface. An example of the mapping or overlaying of the array of grid boxes 612 is shown in FIGS. 6A-6C. The superset polygon 610 may be made up of a plurality of polygons such that a subset of the polygons represent the external contours (or solid portions of the 3D object) and another subset of the polygons represent internal contours or holes. In the example shown in FIGS. 6A-6C, the superset polygon 610 represents a solid star shape. Accordingly, the grid boxes that lie within the polygons that make up the external contours may be turned on while the remaining grid boxes lying within the polygons representing the internal contours may be turned off. At block 508, a list of polygons within the selected 2D surface may be obtained. For instance, the list of polygons may denote the locations within the grid boxes 612 of where the polygons of the superset polygon 610 are located.

At block 510, fill values for the grid boxes 612 overlaid on the 2D surface may be determined based on the positions of the grid boxes 612 with respect to the polygons in the selected 2D surface. The grid boxes 612 lying within the solid portion of the superset polygon 610 may be set to have a certain fill value while the grid boxes 612 laying outside of the superset polygon may have a different fill value. The shaded portions at 602 and 604 in FIGS. 6B and 6C may represent the progress of a scan line fill procedure in determining the values of grid boxes based on their positions relative to the superset polygon 610. An example of the cells containing polygons, i.e., cells having certain fill values, are shown in FIG. 6C as shaded cells. The processing device 110 may thus determine the further partitioned boundary shapes as being the cells containing the polygons.

At block 512, the processing device 110 may determine whether an additional 2D surface exists for which the fill values are to be determined. If yes, a next 2D surface may be selected at block 504 and blocks 506-512 may be repeated for the additional 2D surface. If no 2D surfaces remain for processing in the currently selected bounding shape, it is determined at block 514 if another bounding shape remains to be processed. If at block 514, it is determined that no further bounding shapes remain for processing, the method 500 may terminate on the end block. If at block 514, it is determined that a further bounding shape remains for processing, the method 500 may return to block 502 and blocks 504-514 may be repeated for additional bounding shapes until a determination is made that no further partitioned bounding shapes remain to be processed, at which point the method 500 may terminate at the end block.

Figure 4F:
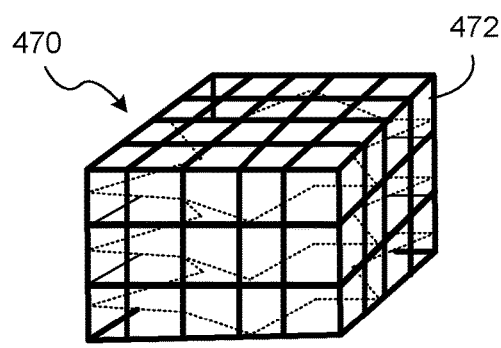
Figure 7:
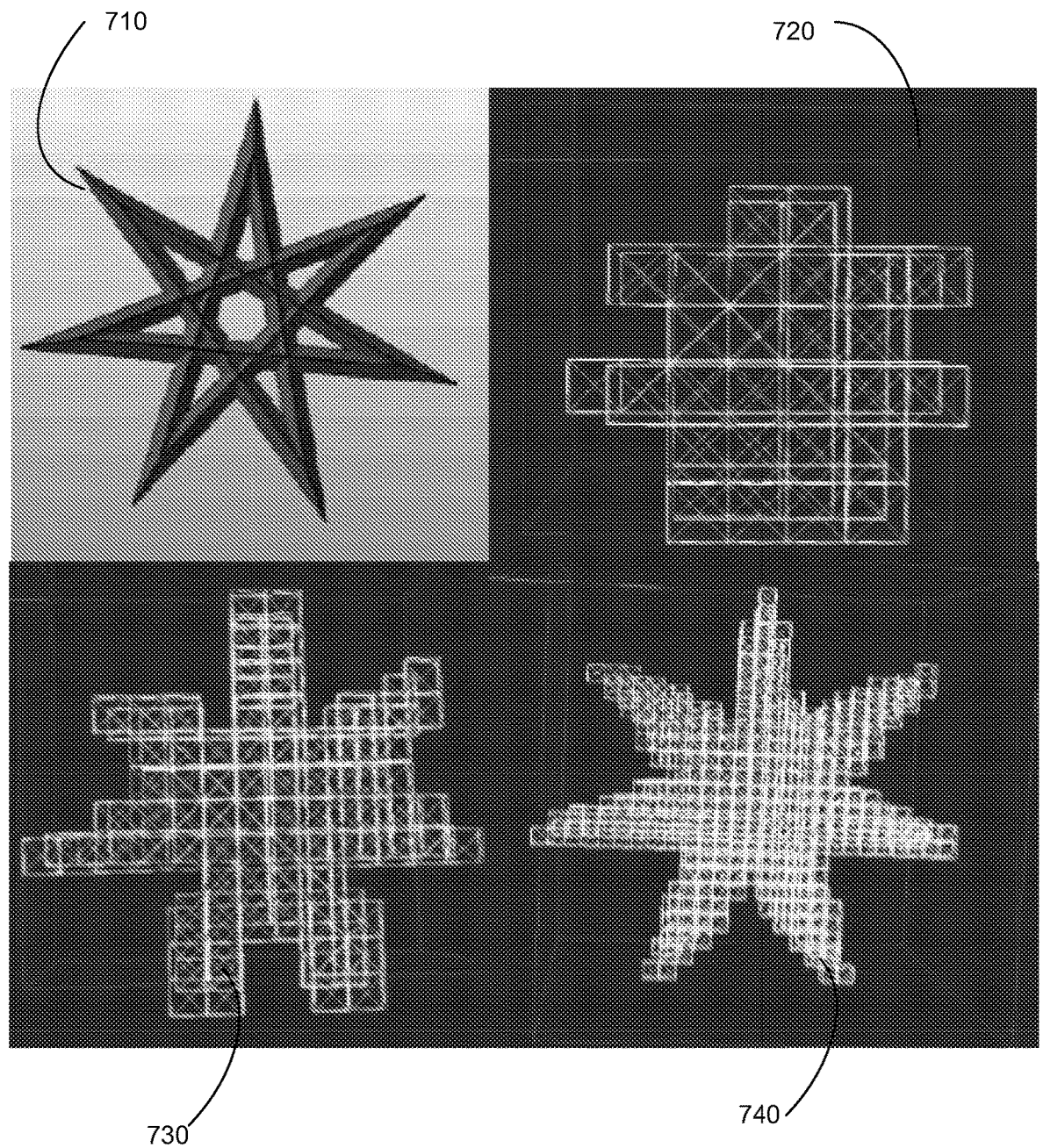
FIG. 7 illustrates examples of various shape profiles that may be generated with different resolution values provided for a 3D object.

Following conclusion of the method 500, a plurality of further partitioned boundary shapes similar to the ones shown in FIG. 4F and FIG. 7 may be generated.

Some or all of the operations set forth in the methods 200, 300, and 500 may be contained as utilities, programs, or subprograms, in any desired computer accessible medium. In addition, the methods 200, 300, and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

It may be appreciated that the processing of the partitioned bounding shapes is shown as occurring serially only by way of illustration and that the 2D surfaces and the plurality of partitioned bounding shapes may be similarly processed in parallel to speed up the process of generating the shape profile. For instance, the computing apparatus 100 may include multiple processing devices 110 and/or the processing device 110 may include multiple cores that may process multiple ones of the virtual layers as described with respect to FIG. 5 in parallel.

FIG. 7 illustrates examples of various shape profiles that may be generated through implementation of the methods disclosed herein with different resolution values provided for a 3D object 710. As mentioned above, the number of geometrical entities and consequently the compute payload may depend on the resolution values NX, NY, and NZ respectively provided in the various directions, for example, in the X, Y, and Z directions. It can be seen from the figure that a first shape profile 720 is based on relatively low resolution value and hence has the least number of geometrical entities (boundary shapes) to be processed. The shape profile 720 may therefore be computed faster than the second and third shape profiles 730 and 740. The resolution values for the second shape profile 730 may be higher than those used for the first shape profile 720 while the resolution values used for the third shape profile 740 may be higher than those used for the first and second shape profiles 720, 730. Hence, the third shape profile 740 may produce a 3D printed object that is closer to the original 3D object in shape but may have higher compute payload as compared with the other shape profiles 720, 730. The resolution values used to generate the shape profiles 720, 730, 740 may be user-selectable based on the applications as outlined herein. As seen from FIG. 7, the shape profiles 720, 730 and 740 may be defined by a plurality of partitioned boundary shapes, in which the boundary shapes may be partitioned in the manners described herein.

The efficiency of many 3D printing applications may be enhanced by implementing the shape profiles as discussed herein. In addition, the shape profiles may be used to enhance security of 3D printing applications. Generally speaking, the shape profiles may be approximations of the polygons that represent the 3D object as opposed to identical replicas that are normally printed. Therefore, the 3D objects printed from the shape profiles may conceal the exact shape of a 3D object. As a result, unauthorized personnel may not inadvertently view the details of the 3D objects being printed from the shape profiles as disclosed herein.

Parts packing or procedures placing many parts or 3D objects into the same build volume to be fabricated together may use bounding boxes to represent a part and place the part within a build volume. While the use of the bounding boxes may lead to lower compute payloads, a downside may be that the space within the build volume may be used less efficiently. For example, if an L-shaped part is approximated as a stacked box, the empty space on the upper right hand side of the 'L' shape is wasted. In this case, a shape profile represented by a set of geometric entities with the resolution values such as NX=NY=1 and NZ=2 may provide an arrangement such that the upper right hand side portion of the 'L' shape remains vacant and a different part may be placed within the vacancy. Thus, the user selectable resolution values afforded by the examples disclosed herein may enable better usage of the space within the build volume. To incorporate the shape profiles as disclosed herein into packing procedures, a single bounding box as required by the packing procedures may be replaced by the vector of stacked boxes and the geometrical operations such as placement, collision detection and the like may be applied simultaneously to the stacked boxes so that the geometrical operations may be executed about the common center of mass for the 3D object enclosed by the stacked boxes. Design rules such as including the required gaps between various 3D objects to be accommodated within a build envelope may be facilitated by enlarging the superset polygons for the bounding shapes (e.g., apply a padding) before the partitioning in the second and the third directions. As discussed above, the padding may be added to the superset polygons at various thicknesses depending upon user-defined inputs, geometrical features of the 3D object, materials used to build the 3D object, combinations thereof, etc.

Another 3D printing application may include generation of support cages that isolate a 3D object or a group of 3D objects from a powder bed to protect the objects from abrasive finishing processes. The support cages may be designed to allow powder outflow and provide sufficient padding while efficiently using the build volume with high packing density. The shape profiles disclosed herein may enable automated generation of a cage skeleton used for printing the cage. In one example, a contour defined by the virtual stacked boxes from the exposed edges of the shape profile which may include the superset polygons of the NL layers are identified, and the cage skeleton may be generated from the contour of the stacked boxes. A padding may also be incorporated within the cage skeleton by enlarging the superset polygons for each of the stacked boxes. Different levels of caging resolutions may be available depending on the applications. For instance, higher powder flowability may require coarser cages while finer cages provide better protection against abrasive finishing procedures. The cages also facilitate higher packing density since the cages are generated from the shape profiles and hence may better fit the body parts that they enclose. A cage may be generated for a single part or for a group of parts in accordance with the examples discussed herein. The procedure to generate the cage for a group of parts involves an operation that Booleans all the part shapes together prior to applying the shape profile.

Another 3D printing application that may be enhanced by incorporation of the shape profiles disclosed herein may be build bed packing preview, which may allow visual inspection of the placement of a 3D object in the build envelope. Hundreds of 3D objects may be potentially included within the build envelope. When a visual inspection service is provided as a cloud service, the shape profiles for the 3D objects as disclosed herein may allow significant geometrical entity reduction. This may reduce the data size required to transmit a view of the contents of the build envelope thereby reducing the network bandwidth required to transmit the view. Moreover, transmitting lower data sizes may also reduce the latency which may result in more responsive web interfaces. The shape profiles as disclosed herein when implemented in the cloud-based visual inspection applications may reduce the cost of the visual inspection services while enhancing user experience. The flexibility afforded by implementing the shape profiles disclosed herein may not only enable providing previews of the contents of the build envelope but may also enable cloud-based editing of the build envelope. Users previewing the contents of the build envelope may be enabled to provide alternative arrangements for shapes within the build envelope.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A computing apparatus comprising:
  a processing device;
  a non-transitory computer readable storage medium on which are stored instructions that when executed by the processing device cause the processing device to:
    access a three dimensional (3D) model of a 3D object;
    slice the 3D model into a plurality of layers in parallel planes, wherein each of the plurality of layers is composed of polygons representing portions of the 3D model;
    partition the plurality of layers into a plurality of stacked boxes, each stacked box containing the polygons representing the portions of the 3D model;
    partition each stacked box of the plurality of stacked boxes into bounding shapes of the 3D object, wherein each bounding shape of the bounding shapes contains a polygon representing one of the portions of the 3D model;

identify, among the bounding shapes, a bounding shape having a highest volume error, wherein a volume error of a particular bounding shape is a difference between a volume of the particular bounding shape and a volume of the polygon in the particular bounding shape;

iteratively partition the bounding shape having the highest volume error into two additional bounding shapes until a size of the additional bounding shapes is less than a predetermined threshold value, wherein the predetermined threshold value is based on a thickness of one of the plurality of layers into which the 3D model was sliced; and generate a shape profile of the 3D object using the bounding shapes.

2. The computing apparatus according to claim 1, wherein the polygons representing the portions of the 3D model represent contours of the 3D model, and wherein the contours of the 3D model include one of an interior portion and a hole of the 3D model.

3. The computing apparatus according to claim 1, wherein to partition the plurality of layers into the plurality of stacked boxes, the instructions are executable to cause the processing device to:
initialize a vector of a first bounding shape that is defined by a first layer and a last layer of the plurality of layers forming the stacked boxes;
compute a volume error of the first bounding shape;
partition the first bounding shape into two bounding shapes; and
replace the first bounding shape in the stacked boxes with the two bounding shapes.

4. The computing apparatus according to claim 3, wherein the instructions are further executable to cause the processing device to compute volume errors for the plurality of layers, to compute the volume error for the first bounding shape by adding the computed volume errors for the plurality of layers contained in the first bounding shape together, and to compute the volume errors for each of the two bounding shapes using the computed volume errors for the plurality of layers respectively contained in the two bounding shapes.

5. The computing apparatus according to claim 3, wherein the instructions are executable to cause the processing device to:
continue to compute volume errors, partition bounding shapes having highest volume errors, and replace the partitioned bounding shapes with further partitioned bounding shapes until a size of the vector falls below a predetermined threshold number of partitions.

6. The computing apparatus according to claim 1, wherein to partition each stacked box into bounding shapes, the instructions are executable to cause the processing device to:
initialize a vector of a first bounding shape;
partition the first bounding shape into two bounding shapes along a first direction;
compute a volume error for each of the two bounding shapes;
locate one of the two bounding shapes having a largest volume error;
partition the located bounding shape having the largest volume error into two additional bounding shapes along the first direction; and
replace the located bounding shape having the largest volume error with the two additional partitioned bounding shapes.

7. The computing apparatus according to claim 6, wherein the instructions are executable to cause the processing device to:
further partition the partitioned bounding shapes along a second direction;
compute a volume error for each of the further partitioned bounding shapes;
locate a further partitioned bounding shape of the further partitioned bounding shapes having a largest volume error of the further partitioned bounding shapes;
partition the located further partitioned bounding shape having the largest volume error into two additional further partitioned bounding shapes along the second direction; and
replace the located further partitioned bounding shape having the largest volume error with the two additional further partitioned bounding shapes.

8. The computing apparatus according to claim 1, wherein the instructions are executable to cause the processing device to:
for each stacked box of the stacked boxes, map a grid of cells over each of the plurality of layers in the stacked box and determine locations, in the grid, of the polygons, wherein the cells in the grid form the bounding shapes containing the polygons.

9. A method comprising:
accessing a three dimensional (3D) model of a 3D object;
slicing, by a processing device, the 3D model into a plurality of layers in parallel planes, wherein each of the plurality of layers is composed of polygons representing portions of the 3D model;
partitioning, by the processing device, the plurality of layers into a plurality of stacked boxes, each stacked box containing the polygons representing the portions of the 3D model;
partitioning, by the processing device, each stacked box of the plurality of stacked boxes into bounding shapes of the 3D object, wherein each bounding shape of the bounding shapes contains a polygon representing one of the portions of the 3D model;
identifying, by the processing device, among the bounding shapes, a bounding shape having a highest volume error, wherein a volume error of a particular bounding shape is a difference between a volume of the particular bounding shape and a volume of the polygon in the particular bounding shape;
iteratively partitioning, by the processing device, the bounding shape having the highest volume error into two additional bounding shapes until a size of the additional bounding shapes is less than a predetermined threshold value, wherein the predetermined threshold value is based on a thickness of one of the plurality of layers into which the 3D model was sliced; and
generating, by the processing device, a shape profile of the 3D object using the bounding shapes.

10. The method according to claim 9, wherein partitioning each stacked box into bounding shapes further comprises:
identifying one of the two additional bounding shapes as an additional bounding shape that has the highest volume error;
determining whether a size of the additional bounding shape that the highest volume error is less than the predetermined threshold value;
in response to a determination that the size of the additional bounding shape that the highest volume error is greater than the predetermined threshold value, partitioning the additional bounding shape that has the highest volume error into two further bounding shapes; and in response to a determination that the size of the additional bounding shape that the highest volume error is less than the predetermined threshold value, ending partitioning the additional bounding shape that the highest volume error.

11. The method according to claim 9, wherein iteratively partitioning one of the two additional bounding shapes further comprises iteratively partitioning one of the two additional bounding shapes having the largest volume error in each of first, second, and third directions that are orthogonal to each other until a size of the partitioned bounding shapes falls below the predetermined threshold value in each of the first, second, and third directions.

12. The method according to claim 11, wherein the predetermined threshold value is a user defined resolution value and wherein the bounding shapes that are used to generate the shape profile of the 3D object comprise shapes selected from cubes, rectangular boxes, honeycombs, and tetrahedrons.

13. The method according to claim 9, further comprising:
for each stacked box, applying a padding to enlarge the polygon in the stacked box, and wherein partitioning each stacked box further comprises partitioning the enlarged polygon in the stacked box.

14. A non-transitory computer readable storage medium on which are stored machine readable instructions that when executed by a processing device, cause the processing device to:

access a three dimensional (3D) model of a 3D object;

slice the 3D model into a plurality of layers in parallel planes, wherein each of the plurality of layers is composed of polygons representing portions of the 3D model;

partition the plurality of layers into a plurality of stacked boxes, each stacked box containing the polygons representing the portions of the 3D model;

partition each stacked box of the plurality of stacked boxes into bounding shapes, wherein each bounding shape of the bounding shapes contains a polygon representing one of the portions of the 3D model;

identify, among the bounding shapes, a bounding shape having a highest volume error, wherein a volume error of a particular bounding shape is a difference between a volume of the particular bounding shape and a volume of the polygon in the particular bounding shape;

iteratively partition the bounding shape having the highest volume error into two additional bounding shapes until a size of the additional bounding shapes is less than a predetermined threshold value, wherein the predetermined threshold value is based on a thickness of one of the plurality of layers into which the 3D model was sliced; and generate a shape profile of the 3D object using the bounding shapes.

15. The non-transitory computer readable storage medium according to claim 14, wherein, to iteratively partition one of the two additional bounding shapes, the machine readable instructions are executable to cause the processing device to:

identify one of the two additional bounding shapes as an additional bounding shape that has the highest volume error;

determine whether a size of the additional bounding shape that the highest volume error is less than the predetermined threshold value;

in response to a determination that the size of the additional bounding shape that the highest volume error is greater than the predetermined threshold value, partition the additional bounding shape that has the highest volume error into two further bounding shapes; and in response to a determination that the size of the additional bounding shape that the highest volume error is less than the predetermined threshold value, end partitioning the additional bounding shape that the highest volume error.

16. The non-transitory computer readable storage medium according to claim 14, wherein, to iteratively partition one of the two additional bounding shapes, the machine readable instructions are executable to cause the processing device to:

iteratively partition one of the two additional bounding shapes having the largest volume error in each of first, second, and third directions that are orthogonal to each other until a size of the partitioned bounding shapes falls below the predetermined threshold value in each of the first, second, and third directions.

17. The non-transitory computer readable storage medium according to claim 15, wherein the predetermined threshold value is a user defined resolution value and wherein the bounding shapes that are used to generate the shape profile of the 3D object comprise shapes selected from cubes, rectangular boxes, honeycombs, and tetrahedrons.

* * * * *